United States Patent
Golberg

(10) Patent No.: US 10,614,438 B2
(45) Date of Patent: Apr. 7, 2020

(54) SELECTIVE SYSTEM FOR RECONCILING ORDER STATES UNDER NON-PERSISTENT CONNECTION CONDITIONS

(71) Applicant: TOAST, INC., Boston, MA (US)

(72) Inventor: Oleg Golberg, Cambridge, MA (US)

(73) Assignee: TOAST, INC., Boston, MA (US)

( * ) Notice: Subject to any disclaimer, the term of this patent is extended or adjusted under 35 U.S.C. 154(b) by 93 days.

(21) Appl. No.: 15/941,423

(22) Filed: Mar. 30, 2018

(65) Prior Publication Data

US 2019/0303898 A1 Oct. 3, 2019

(51) Int. Cl.
| | | |
|---|---|---|
| *G06Q 20/20* | (2012.01) | |
| *G06Q 20/32* | (2012.01) | |
| *G06F 16/27* | (2019.01) | |
| *G06Q 20/16* | (2012.01) | |

(52) U.S. Cl.
CPC ........... *G06Q 20/202* (2013.01); *G06F 16/27* (2019.01); *G06Q 20/325* (2013.01); *G06Q 20/16* (2013.01)

(58) Field of Classification Search
CPC ...... G06F 15/173; G06Q 10/00; G06Q 20/20; G06Q 10/06; G06Q 20/202
USPC ...................... 705/7.25, 21; 700/99; 709/225
See application file for complete search history.

(56) References Cited

U.S. PATENT DOCUMENTS

| | | | |
|---|---|---|---|
| 9,576,287 B1 | 2/2017 | Kalinichenko et al. | |
| 9,665,858 B1 | 5/2017 | Kumar | |
| 9,721,314 B2 | 8/2017 | Rose | |
| 9,741,050 B2 | 8/2017 | Stepanovich | |
| 9,875,469 B1 | 1/2018 | Chin et al. | |
| 2002/0152104 A1* | 10/2002 | Ojha | G06Q 10/06 705/7.25 |
| 2007/0130336 A1* | 6/2007 | Hietala | G06F 21/6218 709/225 |
| 2013/0132274 A1 | 5/2013 | Henderson et al. | |
| 2013/0332509 A1* | 12/2013 | Schwartz | G07C 11/00 709/203 |
| 2014/0052613 A1 | 2/2014 | Tavakoli et al. | |
| 2015/0206116 A1* | 7/2015 | Bess | G06Q 20/202 705/21 |
| 2015/0278830 A1 | 10/2015 | Zamer et al. | |

(Continued)

*Primary Examiner* — Olusegun Goyea
(74) *Attorney, Agent, or Firm* — Richard K. Huffman

(57) ABSTRACT

A system for fulfilling orders under non-persistent network conditions includes a plurality of point-of-sale (POS) terminals and a server. Each of the terminals generates state changes corresponding to one or more orders, queues the changes in order queues, and transmits the changes in the order queues, from oldest to youngest, when operably connected to a network. The server receives the changes and transmits the changes to a subset of the terminals. The synchronization server has a queue processor and a service area map. The queue processor is configured to queue the state changes in terminal queues that correspond to the subset, where the changes are transmitted to a first one of the subset, from oldest to youngest, when it is operably connected to the network, and where the changes are maintained in other terminal queues corresponding to other ones of the subset while the other ones of the subset remain operably disconnected from the network. The service area map associates each of the terminals to one or more service areas, where the subset corresponds to one of the one or more service areas.

20 Claims, 11 Drawing Sheets

(56) References Cited

U.S. PATENT DOCUMENTS

2015/0302388 A1    10/2015   Seidman et al.
2016/0125449 A1*   5/2016   Beatty ................ G06Q 30/0238
                                                                                 705/14.38

* cited by examiner

SYNCHRONIZATION SYSTEM FOR INTERMITTENTLY-CONNECTED POS TERMINALS

SELECTIVE SYSTEM FOR RECONCILING ORDER STATES UNDER NON-PERSISTENT CONNECTION CONDITIONS

CROSS-REFERENCE TO RELATED APPLICATIONS

This application is related to the following co-pending U.S. Patent Applications, each of which has a common assignee and common inventors.

| SERIAL NUMBER | FILING DATE | TITLE |
| --- | --- | --- |
| 15,941,252 | Mar. 30, 2018 | SYNCHRONIZATION MECHANISM FOR INTERMITTENTLY-CONNECTED POINT-OF-SALE TERMINALS |
| 15,941,312 | Mar. 30, 2018 | POINT-OF-SALE TERMINAL FOR RECONCILING ORDER STATES UNDER NON-PERSISTENT CONNECTION CONDITIONS |
| 15,941,351 | Mar. 30, 2018 | ORDER STATES DURABLE QUEUING APPARATUS AND METHOD |
| 15,941,393 | Mar. 30, 2018 | SELECTIVE POINT-OF-SALE TERMINAL FOR RECONCILING ORDER STATE UNDER NON-PERSISTENT CONNECTION CONDITIONS |
| 15,941,452 | Mar. 30, 2018 | SELECTIVE ORDER STATES DURABLE QUEUING APPARATUS AND METHOD |
| 15,941,487 | Mar. 30, 2018 | SYNCHRONIZATION SYSTEM FOR INTERMITTENLY-CONNECTED POINT-OF-SALE TERMINALS EMPLOYING BROWSER BASED ORDERING |
| 15,941,597 | Mar. 30, 2018 | SYNCHRONIZATION SYSTEM FOR INTERMITTENLY-CONNECTED POINT-OF-SALE TERMINALS EMPLOYING BROWSER BASED ORDERING |

BACKGROUND OF THE INVENTION

Field of the Invention

This invention relates in general to the field of point-of-sale (POS) systems, and more particularly to a synchronization mechanism for intermittently-connected POS terminals.

Description of the Related Art

It is rare these days to walk into a retail store or restaurant that has a manually operated cash register along with manual (i.e., pencil and paper) order entry. Rather, it is more common to find one or more electronic point-of-sale (POS) terminals through which a patron may order goods and/or services. And the POS terminals do not merely record orders, but rather account for available inventory, modify items available for order based upon recent orders, and optionally provide for payment for the orders. In many scenarios, most notably restaurants, though wait staff may employ manual techniques to enter and modify orders, such orders are entered by the wait staff themselves into electronic POS terminals at selected positions within the restaurants.

In the case where a server is on-premise within the store or restaurant, present-day technology provides for hardwired connection of multiple POS terminals to the server, typically over a local area network. Though the on-premise server may be coupled to the internet for ancillary functions, such as for processing credit card payments, order fulfillment and synchronization of order stats between POS terminals is generally coordinated by the on-premise server. If the local area network goes down, then staff is forced to resort to fully manual order entry and fulfillment. And since the POS terminals are hardwired to the local area network, they must reside in fixed locations and are not portable.

Another type of POS terminal may be configured as a mobile device, such as a smartphone or tablet, that is equipped with a card or chip reader (typically plugged into an audio jack). The mobile device may run an application program that provides for order entry and fulfillment, and which further may synchronize with a server in the cloud for purposes of order payment processing and inventory management. Food trucks, mobile kiosks, and pop-ups generally use these mobile devices for order entry, fulfillment, and payment.

Though useful, the present inventor has noted that these mobile devices are not scalable. That is, present-day technology only allows for one mobile device per order, which is the reason for long lines around food trucks at noon. While portable, these devices cannot be employed to efficiently service an order for a large group. In the case of a restaurant, the same device must be carried from patron to patron within a given ordering party. In the case of a party of 50, the wait to take and fulfill the party's order. In addition, though these mobile POS devices provide for recovery of state in the presence of intermittent wireless connectivity (as is common in Wi-Fi and cellular networks), they are still limited order throughput because two or more mobile POS devices may not share a single order.

Accordingly, what is needed is an apparatus and method for synchronizing multiple POS terminals, wired and wireless, under intermittent network conditions.

What is also needed is a POS terminal that reconciles multiple order states under non-persistent connection conditions with an associated server in the cloud.

What is further needed is a server in the cloud for synchronizing order states between a plurality of wired and wireless POS terminals.

What is moreover needed is a server in the cloud for synchronizing multiple POS terminals, wired and wireless, under intermittent network conditions, where certain ones of the POS terminals are synchronized with order states within one or more geofenced service areas.

SUMMARY OF THE INVENTION

The present invention, among other applications, is directed to solving the above-noted problems and addresses other problems, disadvantages, and limitations of the prior art. In one aspect, a synchronization system for fulfilling orders under non-persistent network conditions is provided. The synchronization system includes a plurality of point-of-sale (POS) terminals and a synchronization server. Each of the plurality of point-of-sale (POS) terminals is configured to generate state changes corresponding to one or more orders, and is configured to queue the state changes in one or more durable order queues that correspond to the one or more orders, and is configured to transmit the state changes in the one or more durable order queues, from oldest to youngest, when operably connected to a network. The synchronization server is disposed other than where the plurality of POS terminals is disposed, is operably coupled to the plurality of POS terminals via the network, is configured to receive the state changes, and is configured to transmit the state changes to a subset of the plurality of POS terminals. The synchronization server has a queue processor and a service area map. The queue processor is configured to queue the state changes in a plurality of durable terminal queues that correspond to the subset of the plurality of POS terminals, where the state changes are transmitted to a first one of the subset of the plurality of POS terminals, from oldest to youngest, when the first one of the subset of the plurality of POS terminals is operably connected to the network, and where the state changes are maintained in durable terminal queues corresponding to other ones of the subset of the plurality of POS terminals while the other ones of the subset of the plurality of POS terminals remain operably disconnected from the network. The service area map is coupled to the queue processor and is configured to associate each of the plurality of POS terminals to one or more service areas, where the subset of the plurality of POS terminals corresponds to one of the one or more service areas.

Another aspect of the present invention contemplates a synchronization system for fulfilling orders under non-persistent network conditions. The synchronization system includes a plurality of point-of-sale (POS) terminals and a synchronization server. Each of the plurality of point-of-sale (POS) terminals is configured to generate state changes corresponding to one or more orders. Each of the plurality of POS terminals has a state processor, configured to queue the state changes in one or more durable order queues that correspond to the one or more orders, and configured to transmit the state changes in the one or more durable order queues, from oldest to youngest, when operably connected to a network. The synchronization server is disposed other than where the plurality of POS terminals is disposed, and is operably coupled to the plurality of POS terminals via the network, and is configured to receive the state changes, and is configured to transmit the state changes to a subset of the plurality of POS terminals. The synchronization server has a queue processor and a service area map. The queue processor is configured to queue the state changes in a plurality of durable terminal queues that correspond to the subset of the plurality of POS terminals, where the state changes are transmitted to a first one of the subset of the plurality of POS terminals, from oldest to youngest, when the first one of the subset of the plurality of POS terminals is operably connected to the network, and where the state changes are maintained in durable terminal queues corresponding to other ones of the subset of the plurality of POS terminals while the other ones of the subset of the plurality of POS terminals remain operably disconnected from the network. The service area map is coupled to the queue processor and is configured to associate each of the plurality of POS terminals to one or more service areas, where the subset of the plurality of POS terminals corresponds to one of the one or more service areas.

A further aspect of the present invention envisages a synchronization method for fulfilling orders under non-persistent network conditions. The method includes: within each of a plurality of point-of-sale (POS) terminals, generating state changes corresponding to one or more orders, and queuing the state changes in one or more durable order queues that correspond to the one or more orders, and transmitting the state changes in the one or more durable order queues, from oldest to youngest, when operably connected to a network; and via a synchronization server that is disposed other than where the plurality of POS terminals is disposed and that is operably coupled to the plurality of POS terminals via the network, receiving the state changes, and transmitting the state changes to a subset of the plurality of POS terminals. The transmitting includes: queuing the state changes in a plurality of durable terminal queues that correspond to the subset of the plurality of POS terminals, where the state changes are transmitted to a first one of the subset of the plurality of POS terminals, from oldest to youngest, when the first one of the subset of the plurality of POS terminals is operably connected to the network, and where the state changes are maintained in durable terminal queues corresponding to other ones of the subset of the plurality of POS terminals while the other ones of the subset of the plurality of POS terminals remain operably disconnected from the network; and associating each of the plurality of POS terminals to one or more service areas, wherein the subset of the plurality of POS terminals corresponds to one of the one or more service areas.

BRIEF DESCRIPTION OF THE DRAWINGS

These and other objects, features, and advantages of the present invention will become better understood with regard to the following description, and accompanying drawings where.

DETAILED DESCRIPTION

Figure 1:
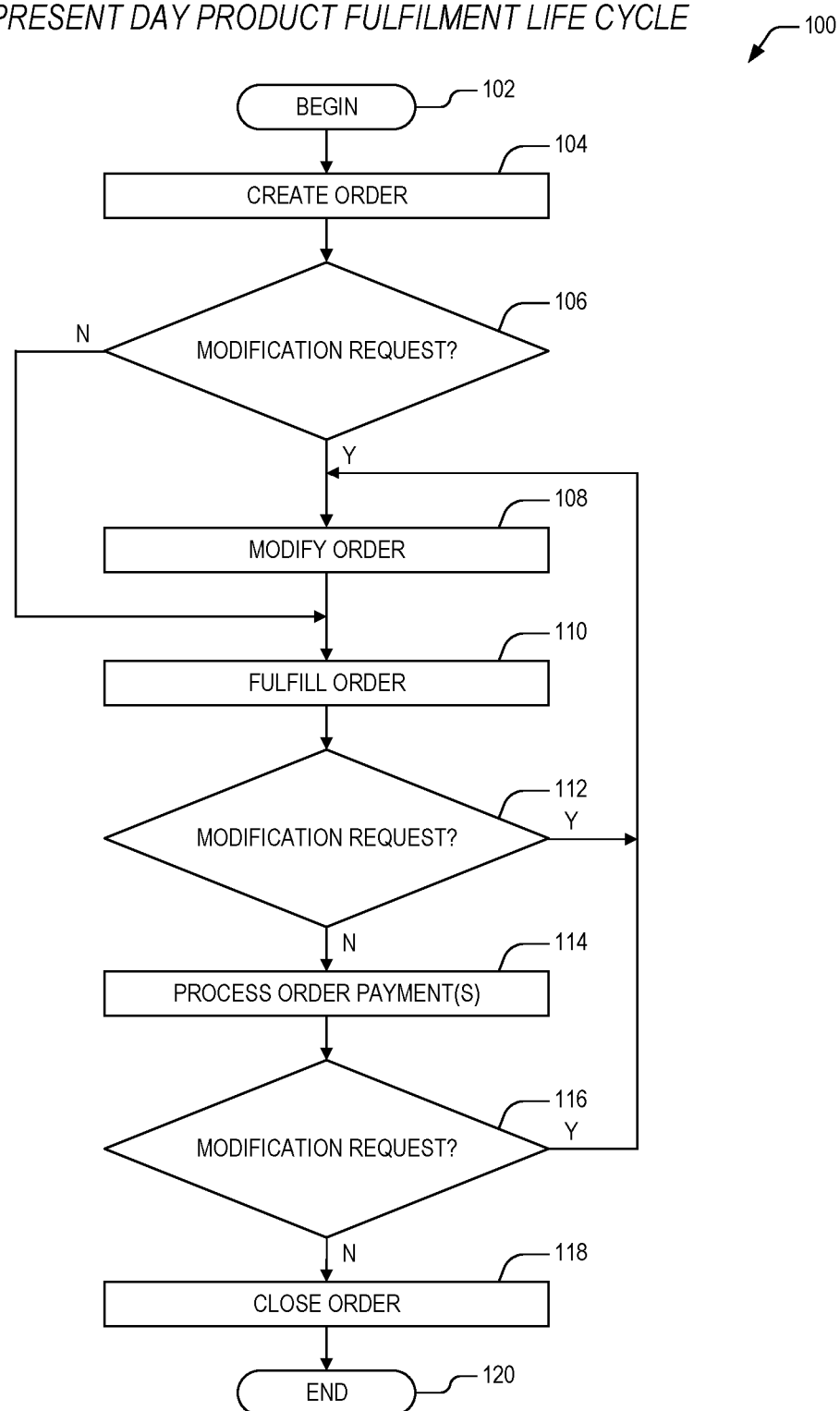
FIG. 1 is a block diagram illustrating a present-day method for fulfilling product orders to one or more patrons.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on present-day POS systems and associated techniques employed therein for dealing with intermittent wired or wireless connections, a discussion of the disadvantages and limitation of those POS will now be presented with reference to FIG. 1. Following this, a discussion of the present invention is presented with reference to FIGS. 2-11. The present invention provides superior mechanisms and techniques whereby multiple intermittently-connected POS terminals may be employed to efficiently process portions of one or more orders in a manner that effectively serves ordering patrons, and that moreover improves the performance of the POS terminals themselves.

Turning to FIG. 1, a block diagram is presented illustrating a present-day method for fulfilling product orders for one or more patrons. The method is indicative of how the one or more patrons may interact with retail staff within a retail establishment for the purpose of ordering, modifying, fulfilling, paying for, and closing out an order for goods and/or services.

Flow begins at block 102, where one or more patrons enter into the retail establishment desirous of purchasing goods and/or services. The retail establishment may comprise, but is not limited to, a restaurant at a fixed location, a mobile restaurant (e.g., food truck), a retail store (e.g., big box store), a hotel lobby having product kiosks, a sports stadium having product stands, an entertainment venue (e.g., movie theater, concert hall), a cruise ship, an airliner, or any other scenario within which one or more patrons may select, pay for, and enjoy goods and/or services. Flow then proceeds to block 104.

At block 104, the one or more patrons select their goods and/or services and an order is created at a POS terminal. The order may be created by the patrons themselves (e.g., self-ordering on the POS terminal) or the order may be initiated by a retail staff member. The order may have identifying information (e.g., an order number) attached thereto. Flow then proceeds to decision block 106.

At decision block 106, an evaluation is made to determine if the order is to be modified. For example, one of the one or more patrons may make a change to the order (e.g., "cut the pickles," "the green lampshade instead of the blue lampshade," etc.). If so, then flow proceeds to block 108. If the order remains unchanged, then flow proceeds to block 110.

At block 108, the order is modified on the POS terminal according to the requested change. Flow then proceeds to block 110.

At block 110, the POS terminal may transmit the order to an order fulfillment area of the retail establishment. For example, in a big box store, this area may comprise a warehouse area in the back. In a restaurant, this area may comprise a kitchen. Other examples abound. Accordingly, retail staff members in the order fulfillment area begin preparations to fulfill the order. Flow then proceeds to decision block 112.

At decision block 112, an evaluation is made to determine if the order is to be modified, yet again. As one skilled in the art will appreciate, patrons are finicky and inconsistent and, as the saying goes, "the customer is always right." If the order remains unchanged, then the order is fulfilled and flow proceeds to block 114. If the order is to be modified, then flow proceeds to block 108.

At block 114, following fulfillment of the order, one or more payment sources for the order are processed by the POS terminal. The payment sources may include, but are not limited to, cash, check, gift cards, gift tokens, magnetic strip credit cards, Europay, MasterCard, and Visa (EMV) credit cards (i.e. chip-and-signature credit cards, chip-and-PIN credit cards), credit cards employing near-field communications (NFC), credit cards employing radio frequency identification (RFID), loyalty accounts, house accounts, and bitcoins and other types of digital currencies. Flow then proceeds to decision block 114.

At decision block 116, an evaluation is made to determine if the order is to be modified even once more. For example, even after initial payment occurs in block 114, the one or more patrons may decide to modify the paid-for order by ordering additional goods and/or services (e.g. "Can I get a coffee in a to go cup?", "Oh, wrong credit card. Use this one."). Accordingly, if the order is to be modified, flow then proceeds to block 108, where the state of the order is modified to allow for consistency, regardless of whether additional fulfillment is required. If the order is not to be modified, flow proceeds to block 118.

At block 118, the POS terminal may change the state of the order to "closed." Flow then proceeds to block 120.

At block 120, the method completes whereby the one or more patrons may exit the retail establishment, having purchased their goods/and or services, or they may remain for purposes of placing a new order.

The method of FIG. 1 is a general and simple case of what may occur in any present-day retail establishment. Though orders may be taken by manually in smaller establishments, more often than not the POS terminal is an electronic data entry and display device in one of two configurations:

In a first configuration, the POS terminal is one of several electronic ordering devices that are coupled to an on-premise server via a hardwired connection, generally a local area network (e.g., Ethernet). That is, an order, its modifications, and its state (e.g., open, fulfilled, paid, closed) are communicated between the POS terminal and the on-premise server via the local area network in the retail establishment. The server may also communicate with one or more order fulfillment terminals in a back warehouse or kitchen area, which are also part of the hardwired local area network. The retail establishment may provide for payment using a different financial system (generally provided for by banking institutions) or payment processing may be an integral part of the POS terminals and on-premise server.

The present inventor has noted, however, that the above configuration is limiting in that patrons are required to wait to order, process payment, etc., until a POS terminal is available. Lines in grocery store or big box store are illustrative of problems with the on-premise, hardwired POS configuration. And when one or more legs of the local area network fail for a period of time (i.e., an occasionally-connected network), retail establishment members much resort to manual methods of order processing, or order processing may be halted altogether until the network is restored. When restored, the individual POS terminals coordinate their particular order statuses and states with the on-premise server. In the case of a restaurant, though multiple wait staff may interact with the one or more patrons, the resulting order for the one or more patrons is typically processed through a single POS terminal, along with orders from other patrons. In a restaurant, though lines of patrons aren't generally seen, the attendant delay is still present waiting for food, payment processing, etc.

In another configuration, as in the case of a smaller or mobile retail establishment, the POS terminal may be coupled via wireless connection, generally via Wi-Fi or cellular (e.g., 3G, 4G, LTE) connection to the internet and may communicate with a server in the cloud for purposes of inventory management and payment, an example of which are the ubiquitous card readers and cloud services provided for by Square, Inc., that turn smartphones and tablet computers into POS terminals. However, the present inventor has also observed that even though a wireless POS terminal maintains consistency of order and transaction data in the presence of network interruptions (as is the case in most Wi-Fi and cellular network configurations), present-day wireless POS configurations are limited in that only one POS terminal may be employed to process a single order. Such is sufficient for a food truck or small retail store where the one or more patron's portions of the order must be processed by only one POS terminal, but the present inventor notes that this configuration is highly inefficient when employed to process an order for a larger group of patrons. Granted, the retail establishment may have more than one wireless POS terminal, but, as one skilled in the art will appreciate, a single order may only be processed by a single POS terminal. In other words, two orders may be processed by two wireless POS terminals, but a single order for a group of patrons cannot be processed by more than one POS terminal, without breaking up the order.

The present invention overcomes the above-noted disadvantages and limitations, and other disadvantages and limitations of present-day POS systems by providing apparatus and methods for synchronizing and processing orders in a cloud-based POS system having multiple wired and/or wireless on-site POS terminals, without requiring an on-premise server. The present invention with now be discussed with reference to FIGS. 2-11.

Figure 2:
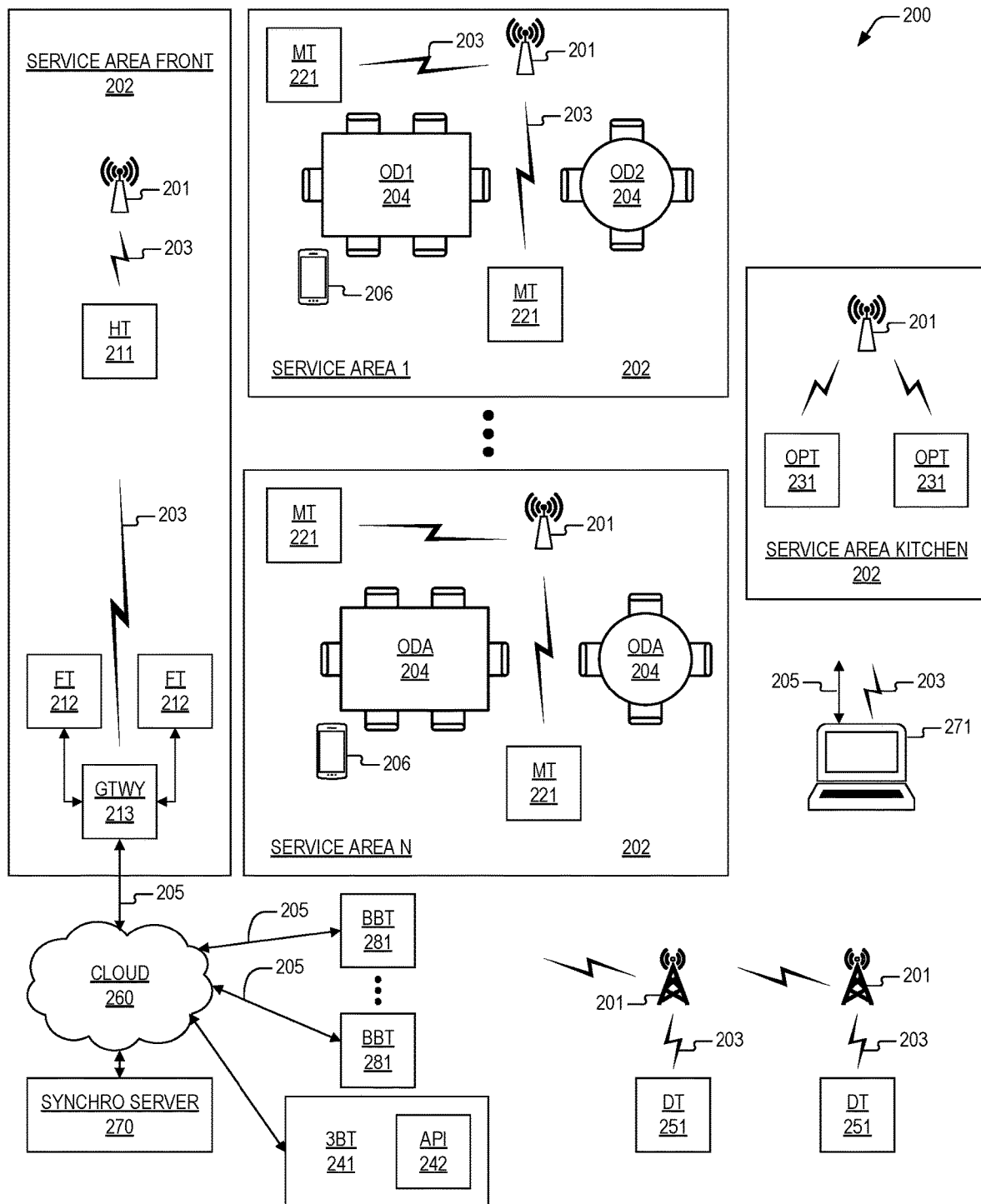
FIG. 2 is a block diagram depicting a synchronization system for intermittently-connected point-of-sale (POS) terminals according to the present invention.

Referring now to FIG. 2, a block diagram is presented depicting a synchronization system 200 for intermittently-connected point-of-sale (POS) terminals according to the present invention. The synchronization system 200 may include one or more service areas 202, such as a front service area 202, service area 1—service area N 202, and service area kitchen 202. Going forward, the present inventor notes that though the present invention is applicable to any type of retail establishment as is described above, a restaurant establishment will be henceforth employed in order to teach relevant aspects of the present invention. The present inventor further notes that though restaurant terms such as host, wait staff, cook, kitchen, food item, etc. may be employed, such terms are used to more clearly teach the present invention in a given context, however, broader and different retail establishment types are contemplated.

The service areas 202 may comprise one or more wireless access points 201. The service areas 202 may also comprise one or more wireless POS terminals 211, 221, 231, coupled to the access points 201 via wireless links 203, and which are distinguished in the system 200 as a host terminal 211, mobile terminals 221, and order processing terminals 231. The service areas 202 may further comprise a gateway 213 to which are coupled one or more fixed hardwired terminals 212, and which provides for coupling of the fixed terminals 212 and access points 201 an internet cloud 260 via conventional wired links 205 such as, but not limited to, Ethernet, cable, fiber optic, and digital subscriber line (DSL) As part of the network path to and through the cloud, providers of internet connectivity (e.g., ISPs) may employ wireless technologies from tower to tower, etc., but for purposes of this application, such links 205 will be referred to as conventional wired links 205 to distinguish them from local and cellular wireless links. The wireless links 203 may comprise, but are not limited to, Wi-Fi, Bluetooth, near field communications, infrared links, IEEE 802.15.4, Zigbee radio links, and cellular based links (e.g., 3G, 4G, LTE) or a combination of the noted links. The POS terminals 211, 212, 221, 231 may be configured differently to comport with intended function (i.e., host seating, order and payment entry, order fulfillment, etc.), or they may be configured similarly. In one embodiment, the mobile terminals 221 may comprise a touch screen display and integral payment processor (e.g., card/chip reader) that provides for both order entry, display of order status, and payment processing. As such, the host terminal 211, fixed terminals 212, and order processing terminals 231 may comprise larger touch screens to allow for easier viewing by restaurant staff, or they may comprise displays with keyboard entry. In one embodiment, terminals 211, 212, 231 may comprise desktop computers, laptop computers, smartphones, or tablets that are running application programs or web-enabled application programs that provide for communication with the synchronization server 270 for purposes of order entry, status updates, and optionally, payment processing.

The system 200 may further comprise a synchronization server 270 that is coupled to the internet cloud 260, and an administrative console 271 that is operably coupled to the synchronization server 270 via a conventional wired link 205 and/or a wireless link 203. The synchronization server 270 is not on-premise and is thus referred to as a cloud server 270. The administrative console 271 may be disposed within the restaurant premises and coupled to the synchronization server 260 via the links 203, 205, or the console 271 may be disposed in another location, say, at an operations headquarters for multiple restaurants within a given region. In addition, the system 200 may comprise one or more browser-based terminals 281 that are coupled to the synchronization server 270 via links 205. In one embodiment, the browser-based terminals 281 may comprise desktop computers, laptop, computers, smartphones, or tablets that are running stand-alone applications or web-enabled applications that provide for communication with the synchronization server 270 for purposes of order entry, status updates, and optionally, payment processing.

The system may further comprise one or more third-party-based terminals 241 that are coupled to the synchronization server 270 via the conventional links 205 though the cloud 260. The third party-based terminals 241 may comprise desktop computers, laptop, computers, smartphones, or tablets that are running stand-alone third-party applications or web-enabled third-party applications that provide for communication with the synchronization server 270 for purposes of order entry, status updates, and optionally, payment processing via a proprietary application programming interface (API) 242. An example of such a terminal 241 may include the well-known GrubHub third-party application that is configured to communicate with the synchronization server 270 via the API 241.

The system 200 may further comprise one or more delivery terminals 251 that are coupled to one or more cellular access points 201 via conventional cellular wireless links 203, and the cellular access points 201 are coupled to the synchronization server 270 via the cloud 260. In one embodiment, the delivery terminals 251 are identical to the mobile terminals 221, and are configured to provide services for order entry, order fulfillment (i.e., delivery), and payment processing. In another embodiment, the delivery terminals 251 are disposed as smartphone or tablets with a detachable payment processor (e.g., card/chip reader). In a further embodiment, the delivery terminals 251 are disposed as smartphone or tablets with a payment processor integrated within a single housing. Other embodiments are contemplated.

Service areas 202 corresponding to the mobile terminals 221 may have one or more tables 204 corresponding to one or more orders. For clarity, service area 1 202 depicts two tables 204, one of which corresponds to order 1 OD1, and the other of which corresponds to order 2 OD2. The mobile terminals 221 within service area 1 202 may processes portions of both order 1 OD1 and order 2 OD2.

Service area N 202 depicts two tables 204, both of which correspond to order A ODA. The mobile terminals 221 within service area N 202 may both process portions order A ODA.

Though disposed within separate service areas (service area 1 202—service area N 202), the mobile terminals 221 therein may be further configured to process portions of any and all orders within the restaurant and may roam from service area 202 to service area to support work load of the restaurant.

The order processing terminals 231 may process all orders in the restaurant, or they may be configured to each process a portion of all of the orders in the restaurant according to preparation station or inventory station.

The host terminal 211 and fixed terminals 212 may be configured to process all orders in the restaurant to provide for on-premise seating assignment, order initiation, order selection, and payment processing, including closeout of orders.

One or more restaurant staff members (not shown) within service area 1 202-service area N 202 may have a personal device (e.g., smartphone, tablet, laptop) 206 that can provide an ad hoc network (i.e., hotspot) to which one or more of the mobile terminals 221 may tether for purposes of communicating with the synchronization server 270 in the absence of Wi-Fi connectivity to the access points 201.

In one embodiment, operations are initiated when the one or more patrons enter the restaurant. Generally, a host (not shown) will create an order (along with corresponding order identifier (01D) via the host terminal 211 for the one or more patrons and will seat the patrons at one or more tables 204.

The created order may include service area designation and assignment of the order to one or more mobile terminals 221. In another embodiment, mobile terminals 221 within a service area 202 are assigned to all orders within that service area 202. Other embodiments are contemplated. The created order and service area assignment are transmitted over the cloud 260 to the synchronization server 270, which maintains a durable terminal queues within which are stored order updates for all orders in the restaurant. Each of the plurality of durable queues correspond to each of the POS terminals 211, 212, 221, 231, 251 within the system 200. When connection status to a given terminal 211, 212, 221, 231, 251 is down (i.e., the server 270 cannot verify communication with the given terminal 211, 212, 221, 231, 251), then the server maintains the order updates for that terminal 211, 212, 221, 231, 251 until connectivity is reestablished, at which time the server 270 may transmit one or more of the order updates to the terminal, verifying with each transmission that the terminal 211, 212, 221, 231, 251 received the update. Advantageously, each of the terminals 211, 212, 221, 231, 251 is capable of processing portions of any of the orders in the restaurant.

Likewise, each of the terminals 211, 212, 221, 231, 251 maintains durable order queues within which are stored order updates only for each of the orders being processed by the terminal 211, 212, 221, 231, 251. Each of the terminals 211, 212, 221, 231, 251 also maintains a plurality of order states that depict a current state for each of the orders in the restaurant. As a seated patron selects one or more menu items, wait staff enters the menu items as an update in one of the terminals 211, 212, 221, 231, 251, generally a mobile terminal 221 assigned to the given service area 202. The order update is entered into one of the durable order queues that corresponds to the order ID. If connectivity if present, then the terminal 211, 212, 221, 231, 251 transmits the order update to the server 270 and waits for the server 270 to acknowledge the order update. If acknowledged, the terminal 211, 212, 221, 231, 251 removes the order update from the one of the durable order queues. If unacknowledged (i.e., in the case of non-persistent network connectivity), the terminal 211, 212, 221, 231, 251 maintains the order update in the one of the durable order queues until such time as connectivity is reestablished, and the terminal 211, 212, 221, 231, 251 completes transmission of the order update with acknowledgement by the server 270.

Upon reception of a particular update from the server 270, the terminals 211, 212, 221, 231, 251 may check one of their plurality of order states that correspond to the particular update for conflicts, as will be described in further detail below. If a conflict exists, the terminals 211, 212, 221, 231, 251 may utilize domain specific rules to resolve the conflict in order to establish a valid order state. Each of the terminals 211, 212, 221, 231, 251 is configured with the same domain specific rules to provide for consistent resolution of order states.

As patrons continue to order items corresponding to the order ID, the one or more of the terminals 211, 212, 221, 231, 251 may enter the order updates and transmit/durably queue the order updates to the server 270 in accordance with connectivity conditions. The server 270 may also queue/transmit order updates for all orders in the restaurant to each of the terminals 211, 212, 221, 231, 251 according each terminal's connectivity. Order fulfillment, payment, and closeout are likewise handled as order updates through the server 270 and are queued/transmitted to all of the terminals 211, 212, 221, 231, 251 in accordance with the connection status of each terminal.

Patrons outside of the restaurant are also handled in similar fashion via the browser-based terminals 281, and third-party terminals 241, though without feedback from the server 270 regarding all orders in the restaurant. When accessed through the browser-based terminals 281 and third-party terminals 241, the server 270 creates and order ID and assigns it to one of the order processing terminals 231 for fulfillment, while sending status updates on the order ID to all of the terminals 211, 212, 221, 231, 251 via the durable terminal queue therein. The server 270 may designate a specific delivery terminal 251 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 271 may maintain a master record of all order states and order updates according to all of the terminals 211, 212, 221, 231, 251 in order to provide for restaurant management, maintenance, analytics, and network traffic analyses. The console 271 may alternatively be disposed in an expediter's area of the restaurant for use by expediters in assignment and allocation of patron seating and terminals 211, 212, 221, 231, 251.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 270 and the POS terminals 211, 212, 221, 231, 251 over that which has heretofore been provided because multiple terminals 211, 212, 221, 231, 251 may be assigned to process portions of a single order, resulting in more timely processing of the single order. Similarly, any of the terminals 211, 212, 221, 231, 251 in the restaurant may be immediately reassigned to a particular order to replace a malfunctioning terminal or to increase throughput of the server 270. Accordingly, computational resources 211, 212, 221, 231, 251, 270 within the system 200 are afforded an overall performance improvement as a result of the present invention.

Figure 3:
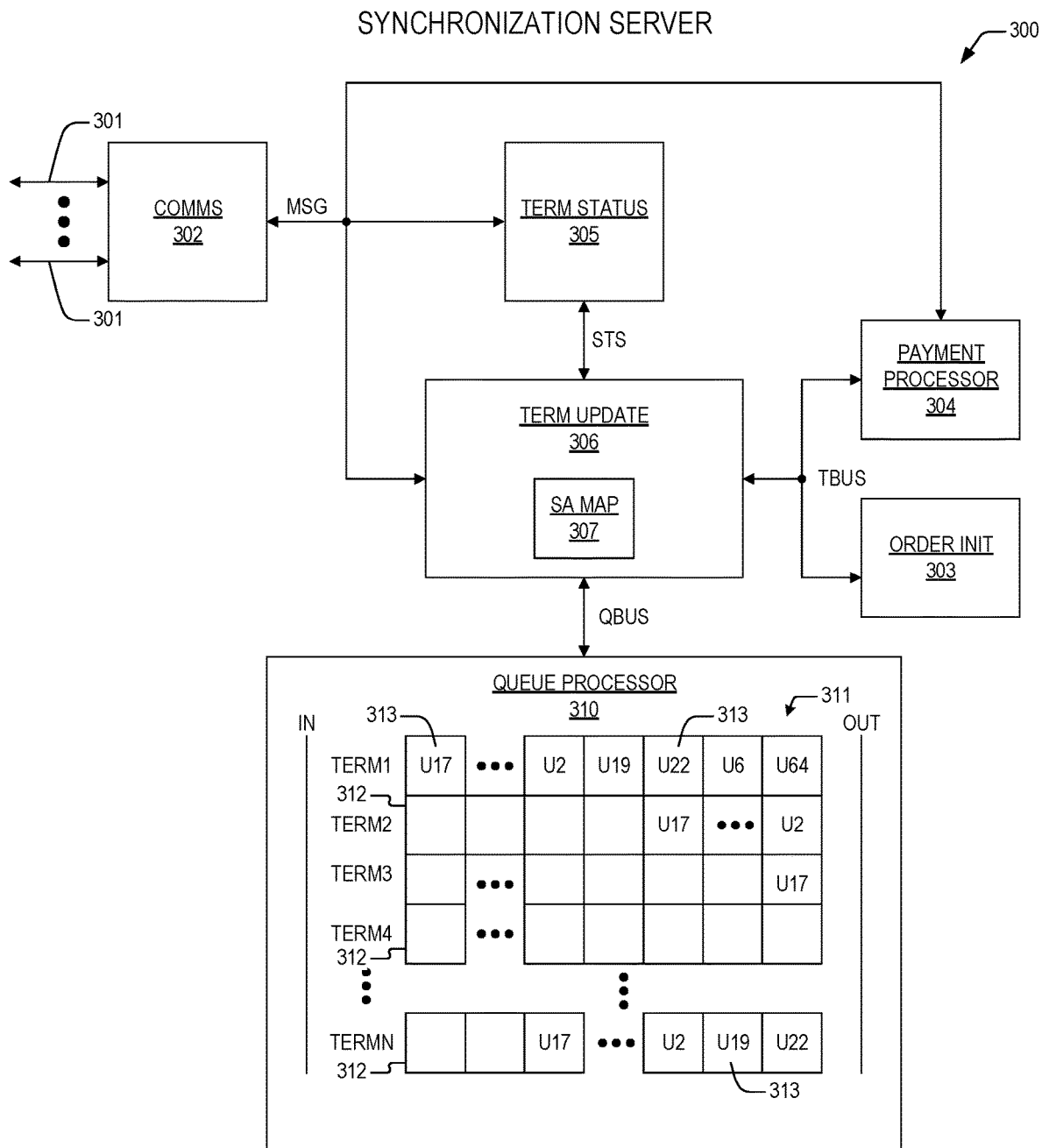
FIG. 3 is a block diagram featuring a synchronization server according to the present invention.

Turning now to FIG. 3, a block diagram is presented featuring a synchronization server 300 according to the present invention, substantially similar to the synchronization server 270 of FIG. 2. The synchronization server 300 may comprise communications circuitry COMMS 302 (e.g., transceivers, modems, message formatter, etc.) that is coupled to one or more wired or wireless communications links 301, examples of which are described above with reference to FIG. 2. The server 300 may also comprise a terminal status element 305, a terminal update element 306, and a payment processor 304, all of which are coupled to COMMS 302 via a message bus MSG. The terminal status element 305 is coupled to the terminal update element 306 via a status bus STS. The terminal update element 306 may comprise a service area map SA MAP 307. The terminal update element 306 is coupled to the payment processor 304 and to an order initiation element ORDER INIT 303 via a terminal bus TBUS. The terminal update element 306 is also coupled to a queue processor 310 via a queue bus QBUS.

The queue processor 310 may include a durable terminal queue 311 that includes terminal update records 312, each of which are associated with a corresponding POS terminal (not shown) that is employed within a given restaurant. In the embodiment of FIG. 3, N terminal update records 312 are shown, each associated with a corresponding one of N POS terminals for the given restaurant. In a large restaurant or big box environment, N may be roughly equal to 100 POS terminals, though larger and smaller numbers are contemplated.

Each of the terminal update records 312 may comprise update fields 313, which are employed to queue order updates for transmission to each of the corresponding POS terminals as connectivity to the corresponding POS terminals permits. Update fields 313 nearest to OUT are the oldest order updates queued for transmission to the corresponding POS terminals. Update fields 313 nearest to IN are youngest (or most recent) order updates queued for transmission to the corresponding POS terminals. Fields 313 between the oldest order updates and the youngest order updates descend in age from oldest to youngest update according to when those updates are received from others of the corresponding POS terminals.

Values of the order update fields 313 may include, but are not limited to, an order ID along with order details taken by the others of the corresponding POS terminals. Accordingly, the terminal update record 312 for POS terminal 1 TERM1 depicts a plurality of order update fields 313 to be transmitted to TERM1 when connectivity is reestablished with TERM1. In decreasing age from oldest to youngest order update, the fields 313 depict updates to order 64 U64, then order 6 U6, then order 22 U22, and so on, culminating with an update to order 17 U17. As one skilled in the art will appreciate, the terminal update record 312 for TERM1 is indicative that TERM1 has been offline (i.e., no connectivity) longer than any of the other POS terminals in the restaurant. This length of time may correspond to a mobile POS terminal that is serving a party on a restaurant porch that has poor Wi-Fi connectivity, or may correspond to a delivery POS terminal that is traversing an area with poor cellular coverage. The terminal update records 312 corresponding to TERM2, TERM 3, and TERMN depict a number of populated order update fields 313 less than the number of fields for TERM1, which may correspond to mobile POS terminals within the restaurant that have only slightly intermittent Wi-Fi connectivity. And the terminal update record for TERM4 through TERM N−1 contain only empty order update fields 313, thus indicated that these POS terminals are up to date on all order state changes within the restaurant.

Operationally, the terminal status element 305 may periodically transmit a first message to each of the POS terminals and update the connectivity status of the POS terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates, as will be described in further detail below.

The terminal status element 305 may provide connectivity status of each of the POS terminals to the terminal update element 306 via bus STS. The service area map 307 is a table that associates each of the POS terminals to one or more service areas within the restaurant. In one embodiment, the terminal update element 306 may generate order update messages from oldest to youngest update for each of the POS terminals that are connected. Connectivity is maintained when a POS terminal acknowledges receipt of an order update message. Once acknowledged, the terminal update element 306 directs the queue processor 310 to delete the oldest order update for that POS terminal and shift pending order updates so that the next oldest order update becomes the oldest order update. In one embodiment, order updates are transmitted to a given POS terminal until its terminal update record 312 is empty, or until connectivity is broken.

In one embodiment, all of the POS terminals associated with the restaurant are updated by the terminal update element 306. In an alternative embodiment, POS terminals are selectively updated in accordance with their mapping to the one or more service areas. For example, the delivery POS terminals may only require knowledge of orders that are to be delivered outside the restaurant, and thus they may be mapped to a "delivery" service area so that order updates that correspond to the delivery service area are transmitted to the delivery POS terminals. Similarly, the restaurant or retail establishment may be so large that management dedicates certain POS terminals to designate service areas. Accordingly, all of the POS terminals in a given service area may be employed to update any order placed within the given service area, but they may not be employed to update orders placed outside of the given service area.

Messages received from the communications circuit 302 may also require additional functions to be performed by the synchronization server 300. For example, when orders are placed by a browser-based or third-party based terminal, the terminal update element 306 may transmit the order update to the order initiation element 303 via TBUS. The order initiation element 303 may then create an order ID for the order update and may assign the order ID to one or more of the POS terminals within the restaurant. Similarly, when an order update message received over the COMMS 302 requires processing of transactions outside of the POS terminals' capabilities (e.g., financial transactions with credit card providers, loyalty card discounts, etc.), the payment processor 304 may generate messages to complete the transactions and the messages are transmitted via COMMS 302. The payment processor 304 may further generate order updates (e.g., "order paid," "payment source 1 approved," "discount amount," etc.) to be transmitted to the POS terminals and may provide these updates to the terminal update element 306 via TBUS. The terminal update element 306 may then provide those updates to the durable queue 311 via QBUS, and the updates are transmitted to the POS terminals in due course dependent upon connection status, as is described above.

The present inventor notes that the term "restaurant" is employed to include those fixed and mobile POS terminals within the restaurant along with corresponding delivery POS terminals associated with the restaurant, such as delivery POS terminals 251 depicted in FIG. 2. There are no terminal update records 312 corresponding to browser-based or third-party-based terminals since orders placed on these devices are created and assigned to one of the POS terminals within the restaurant for fulfillment, preferably order processing terminals, such as the order processing terminals 231 in FIG. 2.

The synchronization server 300 according to the present invention is configured to perform the functions and operations as discussed above. The server 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 300 may be shared with other circuits, microcode, etc., that are employed to perform other functions and/or operations within the server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 4:
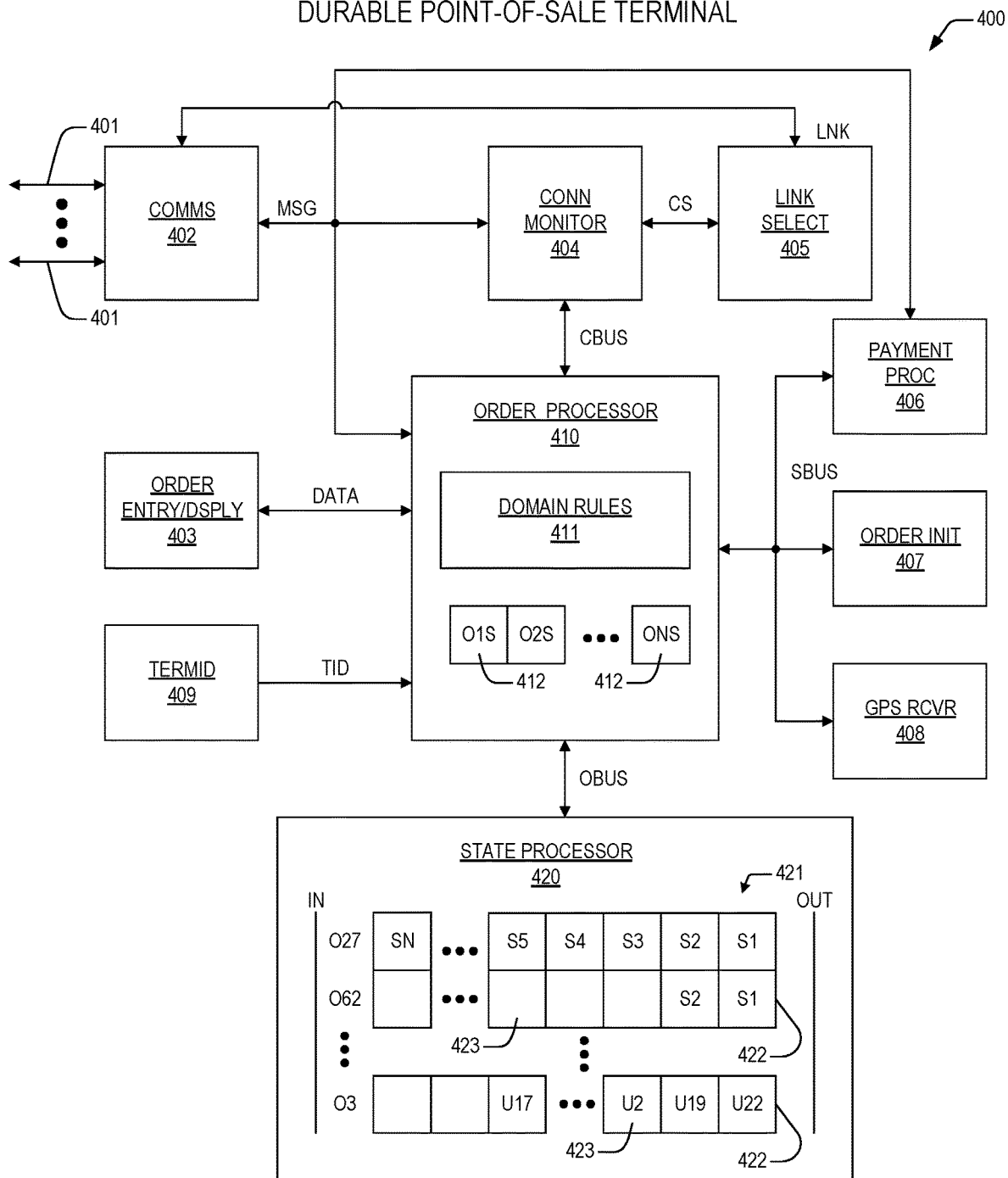
FIG. 4 is a block diagram showing durable POS terminal according to the present invention.

Now referring to FIG. 4, a block diagram is presented showing a durable POS terminal 400 according to the present invention, substantially similar to the POS terminals 211, 212, 221, 231, 252 of FIG. 2. The durable POS terminal 400 may comprise a communications circuit COMMS 402 (e.g., transceivers, modems, message formatter, etc.) that is coupled to one or more wired or wireless communications links 301, examples of which are described above with reference to FIG. 2. The durable POS terminal 400 may also comprise a connection monitor 404, an order processor 410, and a payment processor 406, all of which are coupled to COMMS 302 via a message bus MSG. The durable POS terminal 400 may also comprise a link select element 405 that is coupled to the connection monitor via bus CS and to the COMMS 402 via bus LNK. The order processor 410 is coupled to the connection monitor 404 via bus CBUS and to the payment processor 406, an order initiation element 407, and a GPS receiver 408 via bus SBUS. The order processor 410 is coupled to order entry and display circuits 403 via bus DATA and to terminal ID logic 409 via bus TID. The order processor 410 is also coupled to a state processor 420 via a queue bus QBUS.

The state processor 420 may include a durable order update queue 421 that includes order update records 422, each of which are associated with a corresponding order for the durable POS terminal 400. Individual POS terminals 400 are identified by their corresponding terminal ID, which may be stored within and accessed from the terminal ID element 409.

Each of the order update records 422 may comprise order state fields 423, which are employed to queue order state changes (i.e., order updates) for transmission to a synchronization server (not shown) as connectivity to the synchronization server permits. State fields 423 nearest to OUT are the oldest order state changes queued for transmission to the synchronization server. State fields 423 nearest to IN are youngest (or most recent) order state changes queued for transmission to the synchronization server. Fields 423 between the oldest state fields 423 and the youngest state fields 423 descend in age from oldest to youngest order state change according to when those state changes are entered by POS terminal 400.

Values of the order state fields 423 may include, but are not limited to, an order ID along with order details taken by the POS terminal 400. Accordingly, the order update record 422 for order 27 O27 depicts a plurality of order state fields 423 to be transmitted to the server when connectivity is reestablished. In decreasing age from oldest to youngest order state change, the fields 423 depict order state changes S1 through SN. As one skilled in the art will appreciate, the order update record 422 O27 depicts that many more state changes have been entered while connection status of the POS terminal 400 is down than have been entered for orders 62 O62 through order 3 O3. Advantageously, the POS terminal 400 according to the present invention may be employed for entry of order updates even in the presence of network interruptions, which is characteristic of most Wi-Fi networks.

In operation, order state changes result from two sources: the order entry/display circuit 403 and messages received over COMMS 402 from the synchronization server. In the first case, wait staff in possession of the POS terminal 400 may enter order items as requested by patrons, or in the case of a self-service terminal 400, the patrons may enter the order items themselves. The present invention contemplates provisions within the POS terminal 400 to display menu selections and payment options to both wait staff and patrons. Order items received from the order entry/display circuit 403 are provided to the order processor 410 via bus DATA, which generates the state changes. State changes received from the server are provided to the order processor 410 in messages over bus MSG.

The connection monitor 404 may monitor reception of a first message (e.g., a ping message) from the synchronization server and direct transmission of an acknowledgement message. The connection monitor 404 may update the connectivity status of the POS terminal 400 accordingly. In one embodiment, acknowledgment may comprise a simple acknowledge message. In other embodiments, acknowledgement may comprise additional data such as received signal strength indication RSSI associated with one or more access points, number of hops between the synchronization server and the POS terminal 400, or Global Positioning System (GPS) coordinates, as will be described in further detail below.

The link select element 405 may be employed to direct the COMMS to change links 401 over which to communicate with the server, such as switching from Wi-Fi to LTE, for example. In one embodiment, in the absence of connectivity within the restaurant, the link select element 405 may direct the COMMS 402 to tether to a cellular equipped device corresponding to an order ID, such as devices 206 in FIG. 2, in order to transmit acknowledgements and order state changes to the synchronization server.

The connection monitor 404 may provide connectivity status of the POS terminal 400 to the order processor 410 via bus CBUS. In one embodiment, the order processor 410 may generate order state change messages from oldest to youngest update for each of the orders in the queue 421. Connectivity is maintained when the POS terminal 400 receives acknowledgement of a previously transmitted order state change message from the server. Once acknowledged, the order processor 410 directs the state processor 420 to delete the oldest state change update for a corresponding order ID and shift pending updates so that the next oldest state change update becomes the oldest order update. In one embodiment, state change updates are transmitted to the server until its order state change record 422 is empty, or until connectivity goes down.

Messages received from the communications circuit 402 may also require additional functions to be performed by the POS terminal. For example, when orders are placed by a browser-based or third-party based terminal, the synchronization server may transmit the order state change to the POS terminal 400 and the order processor 410 may direct the state processor 420 to create a corresponding order status record 422 in the queue 421. Similarly, when processing of transactions outside of the POS terminal's capabilities (e.g., financial transactions with credit card providers, loyalty card discounts, etc.) are required, order processor 410 may direct the payment processor 406 to generate messages to the server to provide data (e.g., amounts, payment source type, card swipe/chip information, etc.) to complete the transactions. Such messages are transmitted via COMMS 302. The payment processor 304 may further receive state changes (e.g., "order paid," "payment source 1 approved," "discount amount," etc.) to from the server and may provide these state changes to the order processor 410 via TBUS. The terminal update element 306 may then provide those updates to the durable queue 311 via SBUS. The POS terminal 400 may further be employed to create an order, as in the case of a delivery terminal, a fixed terminal, or a host terminal. Accordingly, from order entry data received over DATA, the order processor 410 may direct the order initiation element to create an order ID and may also direct the state processor to create a corresponding order state record 422 in the queue 421.

The POS terminal 400 terminal according to the present invention is employed to maintain a current state of all orders being fulfilled by the restaurant. The current state of each of the orders are stored in order current state fields 412 within the order processor 410. The order processor 410 may also comprise domain specific rules 411, which define actions required to synchronize conflicting order state changes being received and/or processed by the POS terminal 400, where the domain specific rules 411 are unique to all of the POS terminals 400 employed within the restaurant. For example, suppose that one POS terminal 400 transmits a state change for a specific order to the server, which is acknowledged by the server. Concurrently, a second POS terminal 400 sends a state change for the same order. The server may respond to the second POS terminal with a message indicating that the order current state field 412 for the order ID within the second POS terminal 400 state is out of date (due to connection status) and providing the most recent current state of the order. The domain specific rules 411 are employed by the order processor within the second POS terminal 400 to merge the state changes local to the second POS terminal 400 and may store the merged state in the corresponding current state field 412. The order processor may then direct the COMMS 402 to transmit the corresponding (reconciled) state field 412 contents to the synchronization server for distribution to all the POS terminals 400.

The key component of correct conflict resolution (i.e. merging of state changes to generate a valid current order state is the domain specific rules 411. The rules capture dependencies between individual current state field values and validate state transitions. The domain specific rules 411 may include, but are not limited, rules corresponding to pricing, tax, discount, refund, inventory calculations, and loyalty accrual logic. For example, consider the following sequence of events:

(1) An order with two items totaling $100 is entered via POS terminal A 400. The order contains items, is initially unpaid, and its status is "Open;"
  (2) The order is paid out through POS terminal A 400. The payment amount matches the total, and the order state is updated to "Closed;" and
  (3) However, an additional item priced at $20 is added to the order ID through POS terminal B 400.

Because of the occasionally-connected nature of the system, the changes (2) and (3) happen to be received concurrently by the server.

A generic conflict resolution framework would merge the updates by adding the new item to the order, resulting in the following a closed order having 3 items with a total of $100. This is undesirable because under such a scheme the restaurant will lose money.

However, the order processor 410 according to the present invention may employ the domain specific rules 411 to detect that the total amount required for the order is greater than the payment amount, to determine that the total needs to be recomputed, to change the state of the order from closed back to open, and to recalculate the total. This new current order state is then transmitted to the server and stored in the corresponding order current state field 412. Advantageously, the domain specific rules 411 according to the present invention comprehend that total is dependent upon individual order items, and the status of closed or open is dependent upon the total. Thus, when the additional item is added to the order under (3) above, the order processor 410 changes the status of the order back to open and recalculates the total.

Advantageously, the present invention provides for improvements in performance of computational resources within the POS terminals 400 over that which has heretofore been provided because the terminal 400 may be employed to process orders in the absence of network connectivity. In addition, unnecessary communications with the server are precluded due to on-board conflict resolution logic. Moreover, computing performance is increased because the terminal 400 may be employed to process any of the other orders within the restaurant because the current states of all restaurant orders are resident therein.

The POS terminal according to the present invention is configured to perform the functions and operations as discussed above. The terminal 400 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 400 may be shared with other circuits, microcode, etc., that are employed to perform other functions and/or operations within the terminal 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 5:
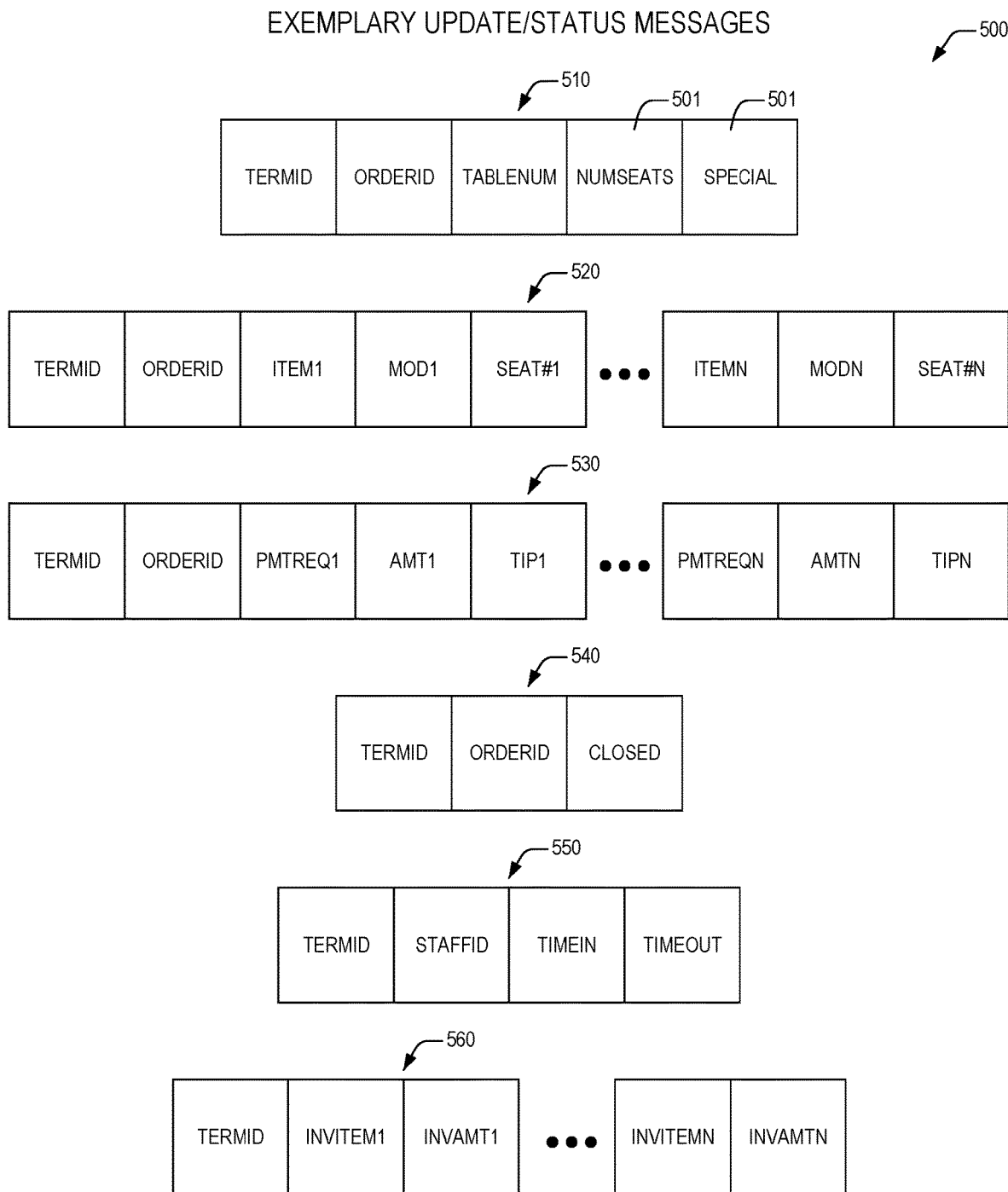
FIG. 5 is a block diagram illustrating exemplary update/status messages according to the present invention that flow between a synchronization server and a durable POS terminal.

Now turning to FIG. 5, a block diagram 500 is presented illustrating exemplary update/status messages according to the present invention that flow between a synchronization server and a durable POS terminal.

An order assignment message 510 transmitted by the server to one or more POS terminals may comprise fields 501 having a specific terminal ID TERMID assigned for a particular order ID ORDERID along with a table number TABLENUM having a given number of seats NUMSEATS. The message 510 may further comprise a SPECIAL field 501 via which special requirements (e.g., high chair, wheel chair access) are communicated to the POS terminal.

An order state change message 520 transmitted from a POS terminal to the server may comprise TERMID and ORDERID fields 501 as described above, along with one or more groups of ITEM, MOD, and SEAT # fields 501, where contents of the ITEM field 501 indicated a menu item ordered for a given seat number at the table along with any modifications to the item number (e.g., rare, no onions, etc.).

A payment state change message 530 transmitted from a POS terminal to the server may comprise TERMID and ORDERID fields along with one or more groups of PMTREQ, AMT, and TIP fields 501, where contents of the PMTREQ field 501 indicate a payment type (e.g., cash, MasterCard, etc.), and contents of AMT and TIP indicate amount of payment for the particular payment type along with a tip amount.

An order closeout message 540 may comprise TERMID and ORDER ID fields 501 as noted above, along with a CLOSED field 501, the contents of which indicate whether the particular order ID is open or closed.

A time clock message 550 exchanged between a POS terminal and the server may comprise a TERMID field 501 as noted above along with a STAFFID, TIMEIN, and TIMEOUT fields 501, where the contents of TIMEIN and TIMEOUT indicate a duration of time for which a staff member identified by STAFFID has employed a particular POS terminal. The server may employ such messages 550 to calculate hours worked by the staff member.

An inventory message 560 may comprise a group of INVITEM and INVAMT fields 501, the contents of which indicate the amount of inventory remaining for a given inventory item as a result of processing current orders in the restaurant. Accordingly, the server may employ the noted amounts to expedite ordering of additional inventory items, or to instruct the POS terminals to remove certain corresponding menu items from their menus that are displayed to wait staff or patrons.

The messages 510, 520, 530, 540, 550, 560 are not exhaustive of those what may be employed according to the present disclosure but are provided herein to teach further aspects and advantages according to the present invention.

Figure 6:
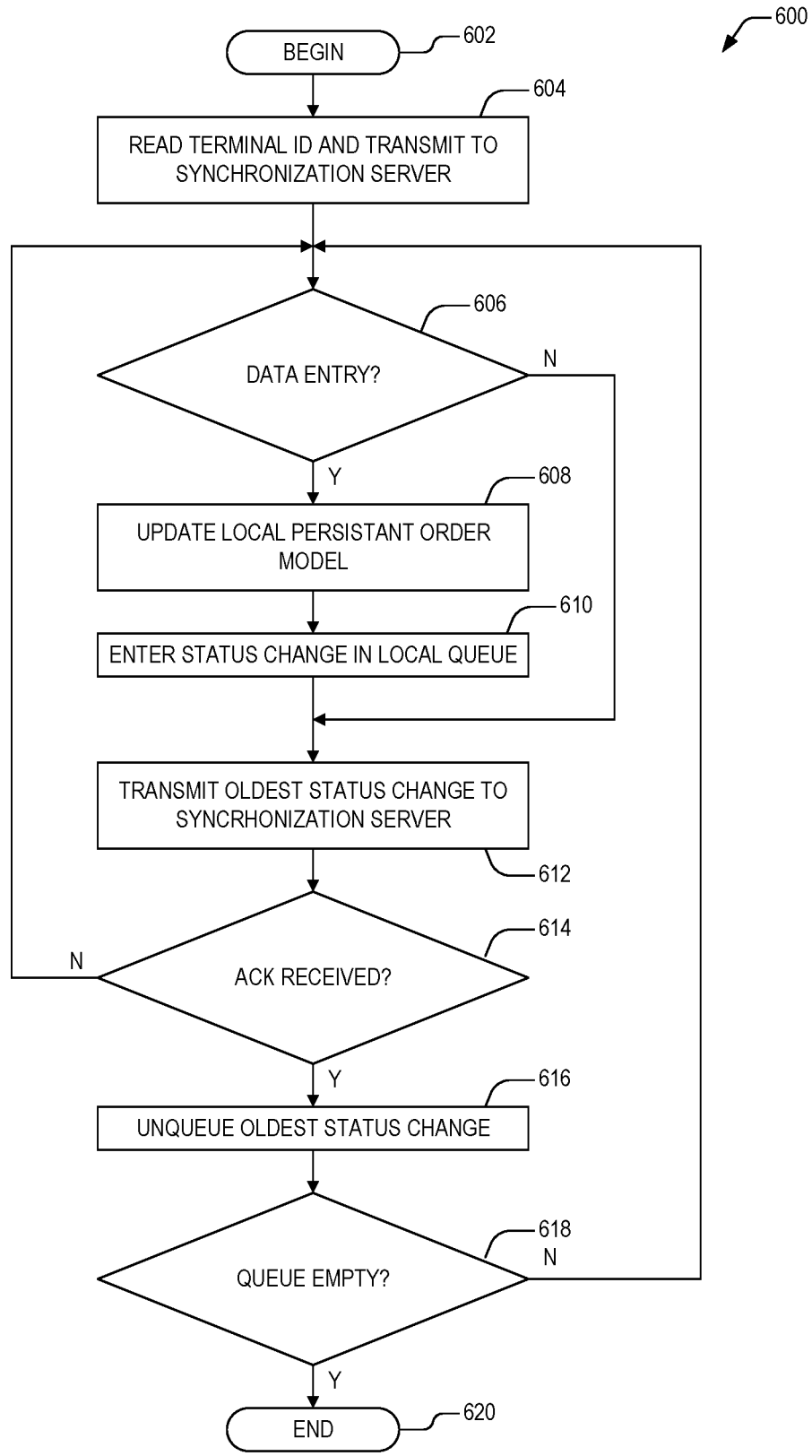
FIG. 6 is a flow diagram detailing a POS terminal queuing method according to the present invention.

Referring now to FIG. 6, a flow diagram 600 is presented detailing a POS terminal queuing method according to the present invention, such as may be employed in a POS terminal as described above with reference to FIGS. 2-5. Flow begins at block 602 where the POS terminal is assigned to a station or wait staff within the restaurant. Flow then proceeds to block 604.

At block 604 the POS terminal accesses it terminal identifier TERMID and transmits a message to the synchronization server that it is online. Flow then proceeds to decision block 606.

At decision block 606, an evaluation is made to determine if order state change data has been entered on or received by the POS terminal. If so, then flow proceeds to block 608. If not, then flow proceeds to block 612.

At block 608, the POS terminal employs domain specific rules therein to resolve conflicts and update a persistent order state field corresponding to the entered/received data. Flow then proceeds to block 610.

At block 610, any state changes resulting from the resolution along with the updated state field are entered into the POS terminal's local durable state change queue for transmission to the server. Flow then proceeds to block 612.

At block 610, the oldest state change for the given order is transmitted to the server. Flow then proceeds to decision block 614.

At decision block 614, an evaluation is made to determine if an acknowledgement message has been received from the server. If not, then flow proceeds to decision block 606. If so, then flow proceeds to block 616.

At block 616, the oldest state change is deleted from the local durable state change queue and all the younger state change for the order, if present, are moved up in the queue. Flow then proceeds to decision block 618.

At decision block 618, an evaluation is made to determine if the local durable state change queue for the particular order is empty. If not, then flow proceeds to decision block 606. If so, then flow proceeds to block 620.

At block 620, the method completes, whereby the POS terminal may access local queue updates for other orders for which is it assigned.

Figure 7:
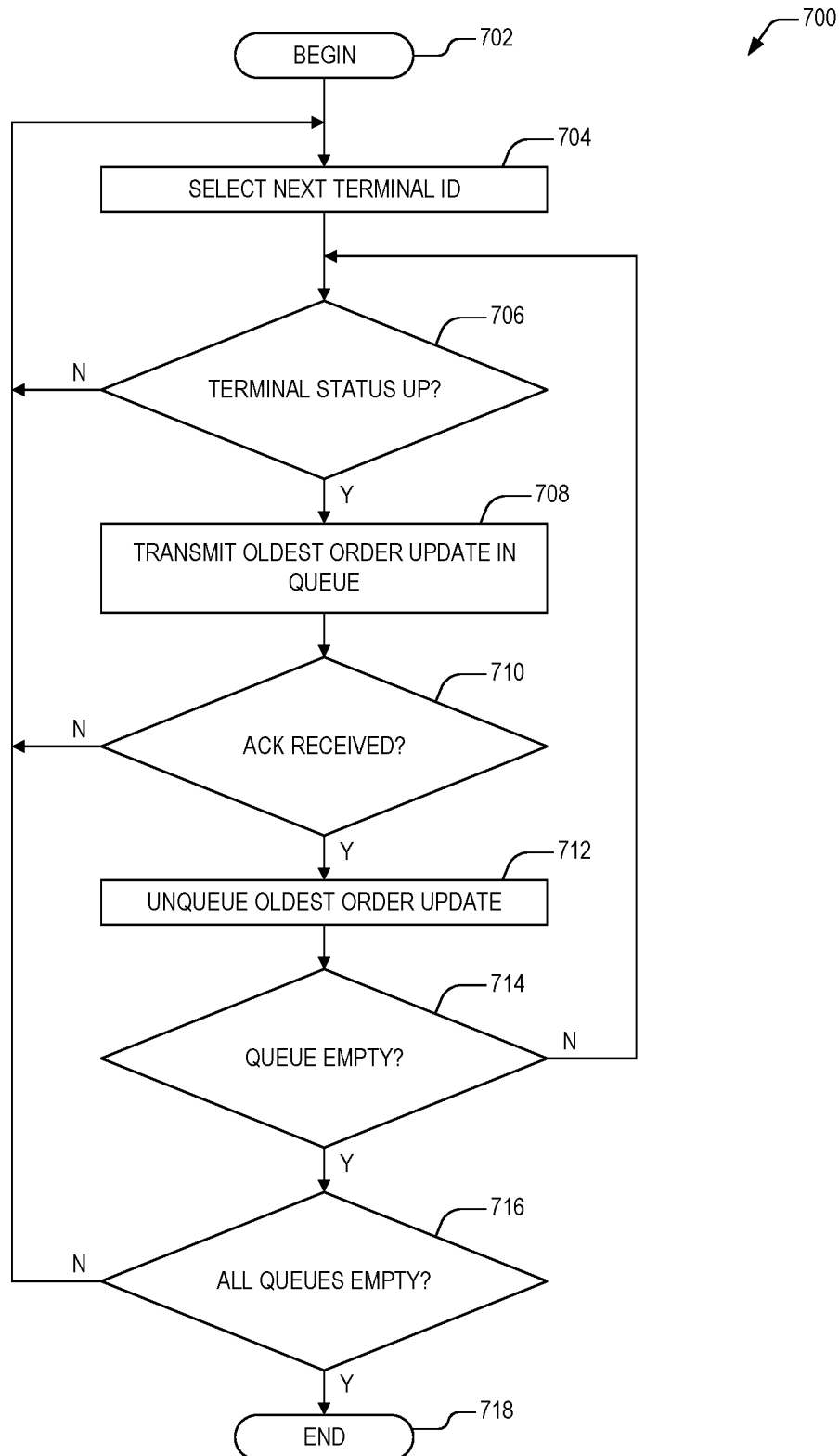
FIG. 7 is a flow diagram illustrating a synchronization server queuing method according to the present invention.

Now turning to FIG. 7, a flow diagram 700 is presented illustrating a synchronization server queuing method according to the present invention, such as may be employed by the server described above with reference to FIGS. 2-5. Flow begins at block 702, where the server accesses its durable terminal update queue comprising terminal update records corresponding to all POS terminals employed within a restaurant (or other retail establishment). Flow then proceeds to block 704.

At block 704, a terminal update record corresponding to a next terminal ID is selected. Flow then proceeds to decision block 706.

At decision block 706, an evaluation is made to determine if a network connection exists between the server and a corresponding POS terminal. If so, then flow proceeds to block 708. If not, then flow proceeds to block 704.

At block 708, the server transmits the oldest order update in the terminal update record to the corresponding POS terminal. Flow then proceeds to decision block 710.

At decision block 710, an evaluation is made to determine if the server has received an acknowledgement message from the corresponding POS terminal. If so, then flow proceeds to block 712. If not, then flow proceeds to block 704.

At block 712, the oldest order update is deleted from the local durable terminal update record and all the younger order updates for the POS terminal, if present, are moved up in the queue. Flow then proceeds to decision block 714.

At decision block 714, an evaluation is made to determine if any order updates remain queued for the corresponding POS terminal. If so, then flow proceeds to decision block 706. If not, then flow proceeds to decision block 716.

At decision block 716, an evaluation is made to determine if all of the terminal update records in the local durable terminal update queue are empty. If not, then flow proceeds to block 704. If so, then flow proceeds to block 718.

At block 718, then method completes.

Figure 8:
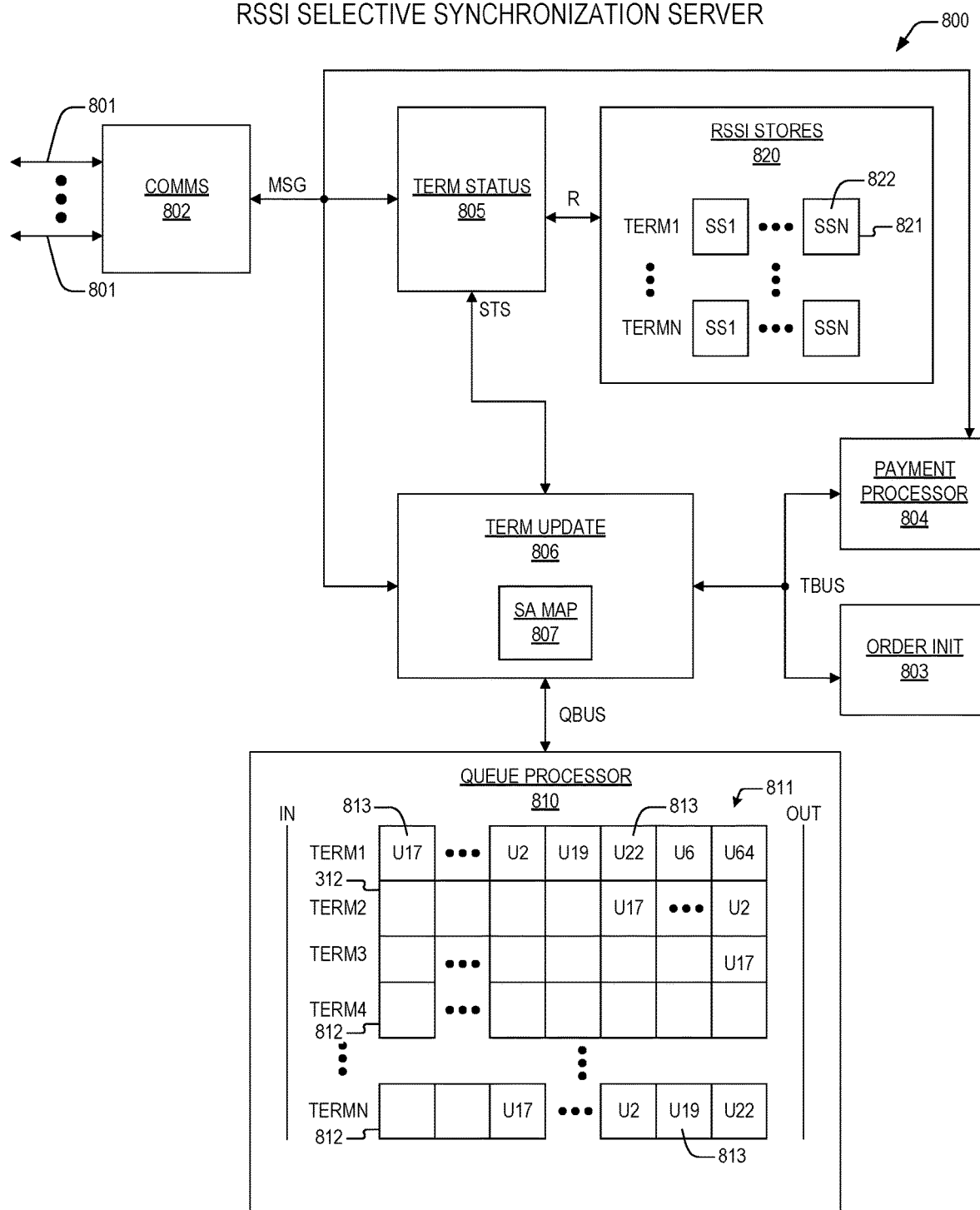
FIG. 8 is a block diagram depicting a selective synchronization server according to the present invention that employs received signal strength indication (RSSI) in the selection of POS terminals for update according to geofenced service areas.

Now referring to FIG. 8, a block diagram is presented depicting a selective synchronization server 800 according to the present invention that employs received signal strength indication (RSSI) in the selection of POS terminals for update according to geofenced service areas. The server 800 is substantially similar to the server 300 described above with reference to FIG. 3. Configuration and operation of like numbered elements is identical to those of FIG. 3, wherein the hundreds digit is changed from "3" to "8."

Unlike the server of FIG. 3, the selective synchronization server 800 additionally includes RSSI stores 820 that is coupled to the terminal status element 805 via bus R. The RSSI stores 820 includes RSSI records 821 for each of the terminals employed within the restaurant. Each of the RSSI records 821 may comprise RSSI fields 822 that each are associated with a corresponding access point located in the restaurant, where the access points include both Wi-Fi access points within the restaurant and cellular access points that are associate with delivery terminals for the restaurant. Contents of each of the RSSI fields 822 comprise an RSSI value for a particular access point as measure for a particular terminal ID. Contents of the RSSI stores 820 are accessed by the terminal status element 805 and are provided to the terminal update element 806 over bus STS.

As noted above with reference to FIG. 3, POS terminals may be selectively updated in accordance with their mapping to the one or more service areas, as indicated by the service area map 807. In the embodiment of FIG. 8, the service area map 807 defines geofenced service areas associated with the restaurant as a function of RSSI values for each of the access points. For example, POS terminals having an RSSI value above a prescribed threshold for certain access points may be mapped within the service area map 807 to correspond with a given area of the restaurant (e.g., banquet room A, warehouse, front desk, kitchen, etc.). Accordingly, the selective synchronization server 800 will only update those POS terminals within a given geofenced service area with updates for orders that are associated with the given geofenced service area.

Figure 9:
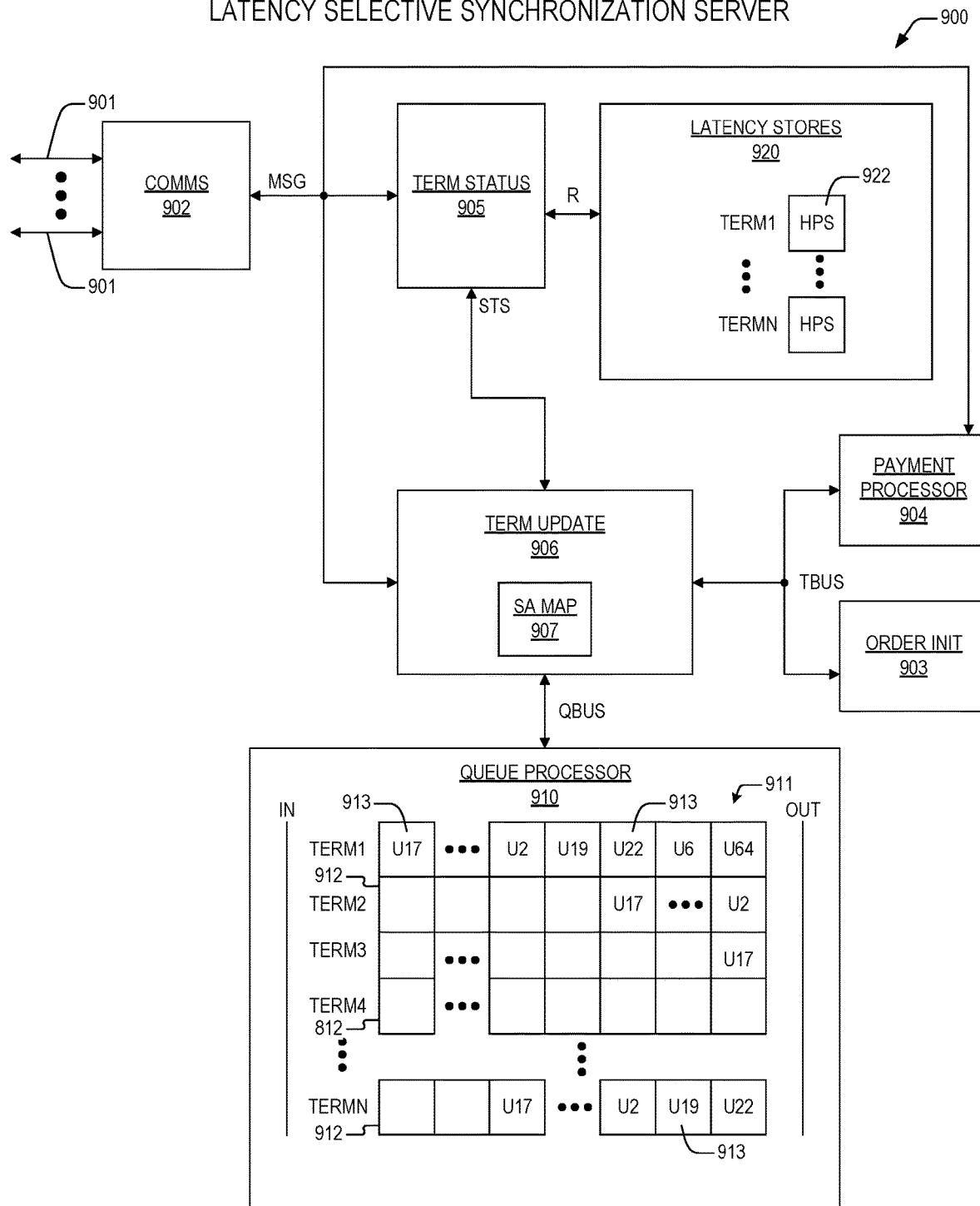
FIG. 9 is a block diagram featuring a selective synchronization server according to the present invention that employs ping latencies in the selection of POS terminals for update according to geofenced service areas.

FIG. 9 is a block diagram featuring a selective synchronization server according to the present invention that employs ping latencies in the selection of POS terminals for update according to geofenced service areas;

Turning now to FIG. 9, a block diagram is presented featuring a selective synchronization server 900 according to the present invention that employs ping latencies in the selection of POS terminals for update according to geofenced service areas. The server 900 is substantially similar to the server 300 described above with reference to FIG. 3. Configuration and operation of like numbered elements is identical to those of FIG. 3, wherein the hundreds digit is changed from "3" to "9."

Unlike the server of FIG. 3, the selective synchronization server 900 additionally includes latency stores 920 that is coupled to the terminal status element 905 via bus R. The latency stores 920 includes a latency field 922 for each of the terminals employed within the restaurant. Contents of each of the latency fields 922 comprise a latency value indicating a number of access point hops for transmission of a message from the server 900 to a corresponding POS terminal. Contents of the latency stores 920 are accessed by the terminal status element 905 and are provided to the terminal update element 906 over bus STS.

As noted above with reference to FIG. 3, POS terminals may be selectively updated in accordance with their mapping to the one or more service areas, as indicated by the service area map 907. In the embodiment of FIG. 9, the service area map 907 defines geofenced service areas associated with the restaurant as a function of the number of hops required to transmit a message from the server 900 to a given POS terminal. For example, POS terminals having latency field values within prescribed ranges may be mapped within the service area map 907 to correspond to given areas of the restaurant (e.g., banquet room A, warehouse, front desk, kitchen, etc.). Accordingly, the selective synchronization server 900 will only update those POS terminals within a given geofenced service area with updates for orders that are associated with the given geofenced service area.

Figure 10:
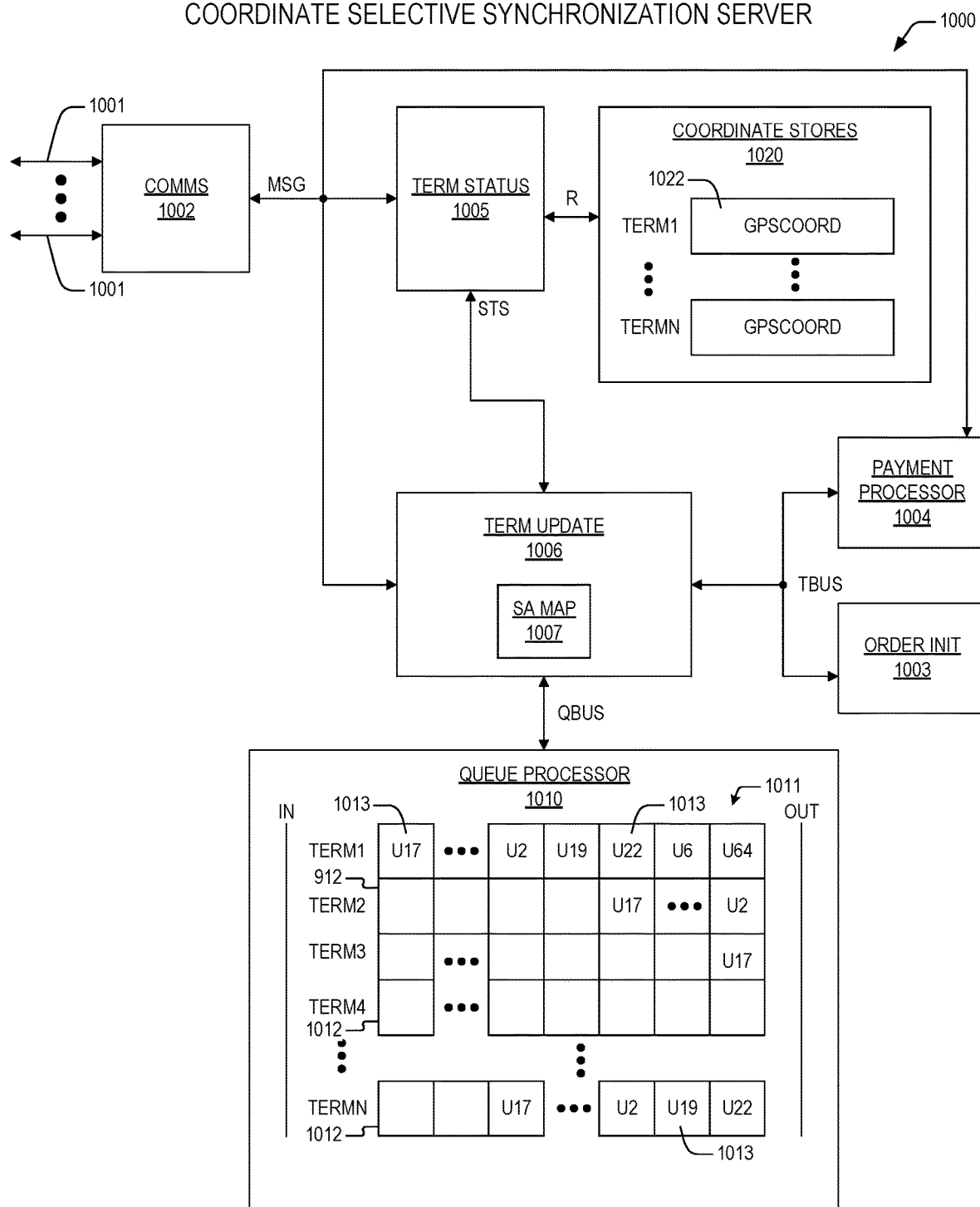
FIG. 10 is a block diagram showing a selective synchronization server according to the present invention that employs Global Positioning System (GPS) coordinates in the selection of POS terminals for update according to geofenced service areas.

Now referring to FIG. 10, a block diagram is presented showing a selective synchronization server 1000 according to the present invention that employs Global Positioning System (GPS) coordinates in the selection of POS terminals for update according to geofenced service areas. The server 1000 is substantially similar to the server 300 described above with reference to FIG. 3. Configuration and operation of like numbered elements is identical to those of FIG. 3, wherein the hundreds digit is changed from "3" to "10."

Unlike the server of FIG. 3, the selective synchronization server 100 additionally includes coordinate stores 1020 that is coupled to the terminal status element 1005 via bus R. The coordinate stores 1020 includes a GPS coordinates field 1022 for each of the terminals employed within the restaurant. Contents of each of the GPS coordinates field 1022 comprise GPS coordinates for a corresponding POS terminal. Contents of the coordinate stores 1020 are accessed by the terminal status element 1005 and are provided to the terminal update element 1006 over bus STS.

As noted above with reference to FIG. 3, POS terminals may be selectively updated in accordance with their mapping to the one or more service areas, as indicated by the service area map 1007. In the embodiment of FIG. 10, the service area map 1007 defines geofenced service areas associated with the restaurant as a function of GPS coordinates. For example, POS terminals having GPS coordinate field values within prescribed ranges may be mapped within the service area map 907 to correspond to given areas of the restaurant (e.g., banquet room A, warehouse, front desk, kitchen, etc.). Accordingly, the selective synchronization server 1000 will only update those POS terminals within a given geofenced service area with updates for orders that are associated with the given geofenced service area.

Figure 11:
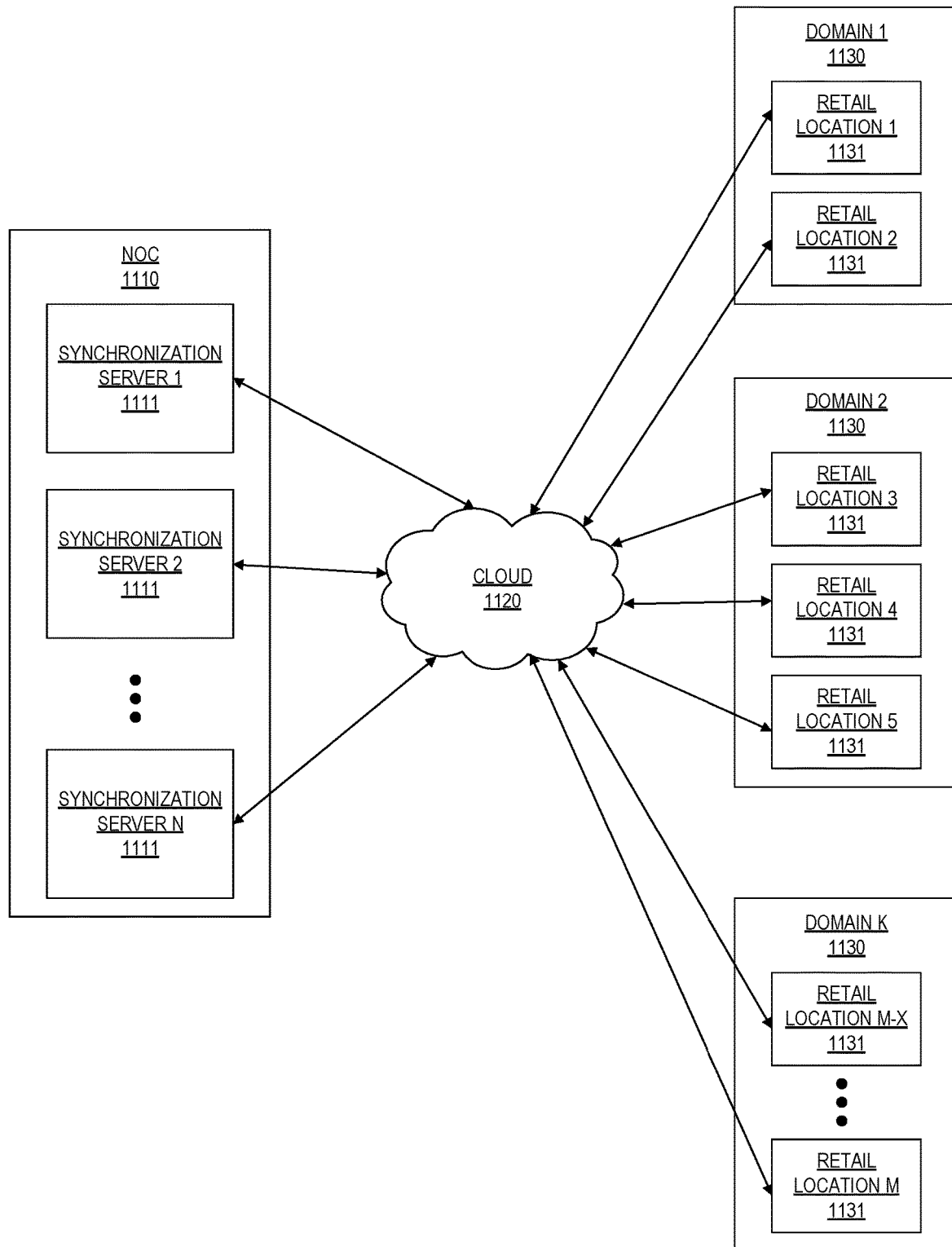
FIG. 11 is a block diagram illustrating a multiple domain synchronization system according to the present invention.

Finally turning to FIG. 11, a block diagram is presented illustrating a multiple domain synchronization system 1100 according to the present invention. The synchronization system 1100 may comprise a network operations center 1110 having a plurality of synchronization servers 1111 as described above with reference to FIGS. 2-10. The servers 1111 are coupled to the internet cloud as is described above. The system 1111 may also comprise a plurality of retail locations 1131 that are also coupled to the cloud 1120. Subsets of the retail locations 1131 are divided into domains 1130, where each of the domains 1130 comprise a unique set of domain specific rules as are described above. Each of the retail locations 1131 may be coupled to one or more of the synchronization severs 1111 to allow for synchronization of order updates for POS terminals (not shown) disposed within the retail locations. For example, POS terminals in retail locations 1 and 2 1131 are within domain 1 1130 and may be served by synchronization server 1 1111. Synchronization server 1 1111 may utilize the same domain specific rules to synchronize updates between POS terminals in locations 1 and 2 1131, where the server 1111 may update all POS terminals within both locations, or selectively update terminals in location 1 1131 with orders corresponding to location 1 1131, and terminals in location 2 1131 with orders corresponding to location 2.

Accordingly, the present invention contemplates synchronization mechanisms that enable business owners having multiple business locations (e.g., locally, statewide, nationwide, and worldwide) to be uniformly provided with order synchronization services via the one or more synchronization servers 1111 assigned thereto. Additionally, the present invention envisages a plurality of servers 1111 disposed within a NOC 1110 that may be assigned to perform order synchronization services for numerous and differing retail establishments (e.g., different restaurants, big box stores, concert halls, etc.)

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The storage medium may be non-transitory or transitory. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A synchronization system for fulfilling orders under non-persistent network conditions, comprising:
   a point-of-sale (POS) terminals, each configured to generate state changes corresponding to orders, and configured to queue said state changes in durable order queues that correspond to said orders, and configured to transmit said state changes in said durable order queues, from oldest to youngest, when operably connected to a network, wherein a first portion of said state changes correspond to a first portion of said orders that are transmitted through a gateway by a first portion of said POS terminals and a second portion of said state changes correspond to a second portion of said orders that are transmitted by a second portion of said POS terminals; and
   a synchronization server, disposed not on-premise with said POS terminals, operably coupled to said POS terminals via said network, configured to receive said state changes, and configured to transmit said first and second portions of said state changes to a subset of said POS terminals, said synchronization server comprising:
- a queue processor, configured to queue said state changes in durable terminal queues that correspond to said subset of said POS terminals, wherein said state changes for all of said orders are transmitted to a first one of said subset of said POS terminals, from oldest to youngest, when said first one of said subset of said POS terminals is operably connected to said network, and wherein said state changes are maintained in durable terminal queues corresponding to other ones of said subset of said POS terminals while said other ones of said subset of said POS terminals remain operably disconnected from said network; and
- a service area map, coupled to said queue processor, configured to associate each of said POS terminals to one or more service areas, wherein said subset of said POS terminals corresponds to one of said one or more service areas.

2. The synchronization system as recited in claim 1, wherein said network comprises the internet.

3. The synchronization system as recited in claim 2, wherein said synchronization server comprises a cloud-based server.

4. The synchronization system as recited in claim 3, wherein two or more of said POS terminals are configured to generate unique ones of said state changes corresponding to a same one of said one or more orders.

5. The synchronization system as recited in claim 4, wherein a first subset of said POS terminals operably connect to said network via one or more Wi-Fi access points that are disposed within a retail facility.

6. The synchronization system as recited in claim 5, wherein a second subset of said POS terminals operably connect to said network via a wired connection disposed within said retail facility.

7. The synchronization system as recited in claim 6, wherein a third subset of said POS terminals operably connect to said network via one or more cellular access points.

8. A synchronization system for fulfilling orders under non-persistent network conditions, comprising:
  point-of-sale (POS) terminals, each configured to generate state changes corresponding to orders, said each of said POS terminals comprising:
    a state processor, configured to queue said state changes in one or more durable order queues that correspond to said orders, and configured to transmit said state changes in said one or more durable order queues, from oldest to youngest, when operably connected to a network, wherein a first portion of said state changes correspond to a first portion of said orders that are transmitted through a gateway by a first portion of said POS terminals and a second portion of said state changes correspond to a second portion of said orders that are transmitted by a second portion of said POS terminals; and
  a synchronization server, disposed not on-premise with said POS terminals, operably coupled to said POS terminals via said network, configured to receive said first and second portions of said state changes, and configured to transmit said first and second portions of said state changes to a subset of said plurality of POS terminals, said synchronization server comprising:
    a queue processor, configured to queue said state changes in durable terminal queues that correspond to said subset of said POS terminals, wherein said state changes for all of said orders are transmitted to a first one of said subset of said POS terminals, from oldest to youngest, when said first one of said subset of said POS terminals is operably connected to said network, and wherein said state changes are maintained in durable terminal queues corresponding to other ones of said subset of said POS terminals while said other ones of said subset of said POS terminals remain operably disconnected from said network; and
    a service area map, coupled to said queue processor, configured to associate each of said POS terminals to one or more service areas, wherein said subset of said POS terminals corresponds to one of said one or more service areas.

9. The synchronization system as recited in claim 8, wherein said network comprises the internet.

10. The synchronization system as recited in claim 9, wherein said synchronization server comprises a cloud-based server.

11. The synchronization system as recited in claim 10, wherein two or more of said POS terminals are configured to generate unique ones of said state changes corresponding to a same one of said one or more orders.

12. The synchronization system as recited in claim 11, wherein a first subset of said POS terminals operably connect to said network via one or more Wi-Fi access points that are disposed within a retail facility.

13. The synchronization system as recited in claim 12, wherein a second subset of said POS terminals operably connect to said network via a wired connection disposed within said retail facility.

14. The synchronization system as recited in claim 13, wherein a third subset of said POS terminals operably connect to said network via one or more cellular access points.

15. A synchronization method for fulfilling orders under non-persistent network conditions, comprising:
  within each of a plurality of point-of-sale (POS) terminals, generating state changes corresponding to orders, and queuing the state changes in durable order queues that correspond to the orders, and transmitting the state changes in the durable order queues, from oldest to youngest, when operably connected to a network, wherein a first portion of said state changes correspond to a first portion of said orders that are transmitted through a gateway by a first portion of said plurality of POS terminals and a second portion of said state changes correspond to a second portion of said orders that are transmitted by a second portion of said plurality of POS terminals; and
  via a synchronization server that is disposed not on-premise with the plurality of POS terminals and that is operably coupled to the plurality of POS terminals via the network, receiving the state changes, and transmitting the first and second portions of the state changes to a subset of the plurality of POS terminals, said transmitting comprising:
    queuing the state changes in a durable terminal queues that correspond to the subset of the plurality of POS terminals, wherein the state changes for all of the orders are transmitted to a first one of the subset of the plurality of POS terminals, from oldest to youngest, when the first one of the subset of the plurality of POS terminals is operably connected to the network, and wherein the state changes are maintained in durable terminal queues corresponding to other ones of the subset of the plurality of POS terminals while the other ones of the subset of the plurality of POS terminals remain operably disconnected from the network; and associating each of the plurality of POS terminals to one or more service areas, wherein the subset of the plurality of POS terminals corresponds to one of the one or more service areas.

16. The synchronization system as recited in claim 15, wherein the network comprises the internet.

17. The synchronization system as recited in claim 16, wherein the synchronization server comprises a cloud-based server.

18. The synchronization system as recited in claim 17, wherein two or more of the subset of the plurality of POS terminals are configured to generate unique ones of the state changes corresponding to a same one of the one or more orders.

19. The synchronization system as recited in claim 18, wherein a first subset of the subset of the plurality of POS terminals operably connect to the network via one or more Wi-Fi access points that are disposed within a retail facility.

20. The synchronization system as recited in claim 19, wherein a second subset of the subset of the plurality of POS terminals operably connect to the network via one or more cellular access points.

* * * * *